(12) United States Patent
Thubert et al.

(10) Patent No.: US 11,909,543 B2
(45) Date of Patent: *Feb. 20, 2024

(54) MULTICAST-ONLY THIN DODAG IN LOW POWER AND LOSSY NETWORK

(71) Applicant: Cisco Technology, Inc., San Jose, CA (US)

(72) Inventors: Pascal Thubert, Roquefort les Pins (FR); Huimin She, Shanghai (CN); Feiliang Wang, Shanghai (CN); Yinfang Wang, Shanghai (CN)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/727,348

(22) Filed: Apr. 22, 2022

(65) Prior Publication Data

US 2022/0247586 A1 Aug. 4, 2022

Related U.S. Application Data

(63) Continuation of application No. 16/844,094, filed on Apr. 9, 2020, now Pat. No. 11,394,567.

(51) Int. Cl.
*H04L 12/00* (2006.01)
*H04L 12/18* (2006.01)
(Continued)

(52) U.S. Cl.
CPC .............. *H04L 12/18* (2013.01); *H04L 45/16* (2013.01); *H04L 49/201* (2013.01); *H04L 65/611* (2022.05)

(58) Field of Classification Search
None
See application file for complete search history.

(56) References Cited

U.S. PATENT DOCUMENTS

| 6,917,618 | B2 | 7/2005 | Thubert et al. |
| 7,519,733 | B1 | 4/2009 | Thubert et al. |
| 8,406,153 | B2 | 3/2013 | Vasseur et al. |
| 9,288,066 | B2 | 3/2016 | Hui et al. |

(Continued)

FOREIGN PATENT DOCUMENTS

| CN | 103118413 A | * | 5/2013 | |
| EP | 1259027 A2 | * | 11/2002 | ............. H04L 12/18 |

(Continued)

OTHER PUBLICATIONS

Thubert, Ed., et al., "Address Protected Neighbor Discovery for Low-power and Lossy Networks", Feb. 25, 2019, [online], 6lo Internet Draft, Feb. 25, 2019, [retrieved on Mar. 12, 2020]. Retrieved from the Internet: URL: <https://tools.ietf.org/pdf/draft-ietf-6lo-apnd-11.pdf>, pp. 1-26.

(Continued)

*Primary Examiner* — Gerald A Smarth
(74) *Attorney, Agent, or Firm* — BEHMKE INNOVATION GROUP LLC; James M. Behmke; James J. Wong

(57) ABSTRACT

In one embodiment, a method comprises: generating, by a constrained low power and lossy network (LLN) device that is localized within a subregion of an LLN, a thin destination oriented directed acyclic graph (DODAG) having up to a prescribed limit of attached LLN devices at each hop of the thin DODAG based on generating a DODAG information object (DIO) message specifying an instruction for limiting attachment at each hop of the thin DODAG to the prescribed limit; and causing, by the constrained LLN device, multicast-only transmissions via the thin DODAG based on inserting into the DIO message a multicast-only transmission mode via the thin DODAG and outputting the DIO message, the DIO message causing each neighboring LLN device to selectively attach to the constrained LLN device as (Continued)

an attached child LLN device based on the instruction and execute the multicast-only transmissions via the thin DODAG.

8 Claims, 6 Drawing Sheets

(51) Int. Cl.
*H04L 45/16* (2022.01)
*H04L 49/201* (2022.01)
*H04L 65/611* (2022.01)

(56) References Cited

U.S. PATENT DOCUMENTS

| | | | |
|---|---|---|---|
| 9,300,581 B1* | 3/2016 | Hui | H04W 40/02 |
| 9,426,035 B2 | 8/2016 | Shetty et al. | |
| 9,749,410 B2 | 8/2017 | Thubert et al. | |
| 9,900,169 B2 | 2/2018 | Thubert et al. | |
| 9,948,542 B2 | 4/2018 | Thubert et al. | |
| 10,135,756 B2 | 11/2018 | Pfister et al. | |
| 11,044,682 B1 | 6/2021 | Thubert et al. | |
| 2012/0218883 A1* | 8/2012 | Xu | H04L 65/4061 370/225 |
| 2014/0108643 A1 | 4/2014 | Hui et al. | |
| 2015/0029927 A1 | 1/2015 | Janneteau et al. | |
| 2015/0201312 A1* | 7/2015 | Tjahjono | H04L 45/16 370/312 |
| 2015/0381473 A1 | 12/2015 | Murakami et al. | |
| 2016/0219414 A1 | 7/2016 | Purohit | |
| 2017/0264532 A1 | 9/2017 | Guo et al. | |
| 2018/0102965 A1* | 4/2018 | Hari | H04L 12/185 |
| 2019/0261138 A1 | 8/2019 | Thubert et al. | |
| 2020/0259680 A1* | 8/2020 | Thubert | H04L 12/6402 |
| 2021/0258182 A1 | 8/2021 | Thubert et al. | |
| 2021/0314290 A1 | 10/2021 | Thubert et al. | |
| 2021/0320809 A1 | 10/2021 | Thubert et al. | |

FOREIGN PATENT DOCUMENTS

| | | | | |
|---|---|---|---|---|
| WO | WO-2009143287 A1 * | 11/2009 | | F16K 31/046 |
| WO | 2017141076 A1 | 8/2017 | | |

OTHER PUBLICATIONS

Xie et al., "Collision Minimized Firmware Upgrade for LLNS Using Multiple Multicast Domains", Feb. 16, 2018, Cisco Systems, IP.com No. IPCOM000252867D, 9 pages.

Hui et al., "Multicast Protocol for Low-Power and Lossy Networks (MPL)", Internet Engineering Task Force (IETF), Request for Comments: 7731, Feb. 2016, [online]. [retrieved on Feb. 19, 2020]. Retrieved from the Internet: URL: <https://tools.ietf.org/pdf/rfc7731.pdf>, pp. 1-29.

Vida, Ed., et al., "Multicast Listener Discovery Version 2 (MLDv2) for IPv6", Network Working Group, Request for Comments: 3810, Jun. 2004, [online], [retrieved on Mar. 19, 2020]. Retrieved from the Internet: URL: <https://tools.ietf.org/pdf/rfc3810.pdf>, pp. 1-62.

Deering et al., "IPv6 Scoped Address Architecture", Network Working Group, Request for Comments: 4007, Mar. 2005, [online], [retrieved on Jan. 30, 2020]. Retrieved from the Internet: URL: <https://tools.ietf.org/pdf/rfc4007.pdf>, pp. 1-24.

Narten et al., "Neighbor Discovery for IP version 6 (IPv6)", Network Working Group, Request for Comments: 4861, Sep. 2007, [online], [retrieved on Mar. 19, 2020]. Retrieved from the Internet: URL: <https://tools.ietf.org/pdf/rfc4861.pdf>, pp. 1-97.

Schmidt et al., "Multicast Mobility in Mobile IP Version 6 (MIPv6): Problem Statement and Brief Survey", Internet Research Task Force (IRTF), Request for Comments: 5757, Feb. 2010, [online], [retrieved on Mar. 19, 2020]. Retrieved from the Internet: URL: <https://tools.ietf.org/pdf/rfc5757.pdf>, pp. 1-37.

Winter, Ed., et al., "RPL: IPv6 Routing Protocol for Low-Power and Lossy Networks", Internet Engineering Task Force (IETF), Request for Comments: 6550, Mar. 2012, [online], [retrieved on Jan. 31, 2020]. Retrieved from the Internet: URL: <https://tools.ietf.org/pdf/rfc6550.pdf>, pp. 1-157.

Ghaleb et al., "Load-balancing and Stability Aware Objective Function (LBSA)", [online], IETF ROLL Working Group, Mar. 23, 2020 [Retrieved on Mar. 30, 2020]. Retrieved from the Internet: URL: <https://tools.ietf.org/pdf/draft-baraq-roll-lbsa-00.pdf>, pp. 1-7.

Richardson, "Enabling secure network enrollment in RPL networks", [online], IETF ROLL Working Group, Mar. 19, 2020 [Retrieved on Mar. 30, 2020]. Retrieved from the Internet: URL: <https://tools.ietf.org/pdf/draft-ietf-roll-enrollment-priority-01.pdf>, pp. 1-6.

Qasem et al., "Load Balancing Objective Function in RPL", [online], IETF ROLL Working Group, Oct. 29, 2017 [retrieved on Apr. 8, 2020], Retrieved from the Internet: URL: <https://tools.ietf.org/pdf/draft-qasem-roll-rpl-load-balancing-02.pdf>, pp. 1-11.

Qasem et al., "Load Balancing Objective Function in RPL", [online], IETF ROLL Working Group, Oct. 29, 2017 [retrieved on Apr. 8, 2020], Retrieved from the Internet: URL: <https://tools.iettorg/pdf/draft-qasem-roll-rpl-load-balancing-02.pdf>, pp. 1-11.

\* cited by examiner

MULTICAST-ONLY THIN DODAG IN LOW POWER AND LOSSY NETWORK

This application is a continuation of application Ser. No. 16/844,094, filed Apr. 9, 2020.

TECHNICAL FIELD

The present disclosure generally relates to a multicast-only thin destination oriented directed acyclic graph (DODAG) in a low power and lossy network.

BACKGROUND

This section describes approaches that could be employed, but are not necessarily approaches that have been previously conceived or employed. Hence, unless explicitly specified otherwise, any approaches described in this section are not prior art to the claims in this application, and any approaches described in this section are not admitted to be prior art by inclusion in this section.

A Low-power and Lossy Network (LLN) is a network that can include dozens or thousands of low-power router devices configured for routing data packets according to a routing protocol designed for such low power and lossy networks: such low-power router devices can be referred to as LLN devices, or "RPL nodes" in the case of low-power router devices utilizing the Routing Protocol for Low Power and Lossy Networks (RPL) as described in the Internet Engineering Task Force (IETF) Request for Comments (RFC) 6550. Each LLN device in the LLN typically is constrained by processing power, memory, and energy (e.g., battery power); interconnecting wireless links between the LLN devices typically are constrained by high loss rates, low data rates, and instability with relatively low packet delivery rates. A network topology (e.g., a "RPL instance") can be established based on creating routes in the form of a directed acyclic graph (DAG) toward a single "root" network device, also referred to as a "DAG root" or a "DAG destination". Hence, the DAG also can be referred to as a Destination Oriented DAG (DODAG). Network traffic moves either "up" towards the DODAG root or "down" towards the DODAG leaf nodes.

The constraints in processing power, memory, and energy in the LLN devices described above can result in substantial difficulties in providing low-latency localized multicast in a large-scale LLN, where dozens of LLN devices in a localized area (e.g., an identifiable neighborhood) of the LLN need to be triggered to perform a prescribed operation (e.g., increase a smart light setting in response to detecting a pedestrian). Use of storing mode as described in RFC 6550 is not feasible due to the storage requirements exceeding the constrained memory capacities of existing LLN devices. Nonstoring mode (or "non-storing" mode) as described in RFC 6550 also is not feasible due to the increased latency encountered in larger LLNs, especially because multicast in RPL requires a sequence of unicast retransmissions to each of the subscribing LLN devices in a multicast group, which can result in an exponentially-increasing latency based on the number of multicast subscribers and the nature of the DODAG topology providing the sequential unicast transmissions to the multicast subscribers.

BRIEF DESCRIPTION OF THE DRAWINGS

Reference is made to the attached drawings, wherein elements having the same reference numeral designations represent like elements throughout and wherein.

DESCRIPTION OF EXAMPLE EMBODIMENTS

Overview

Figure 1:
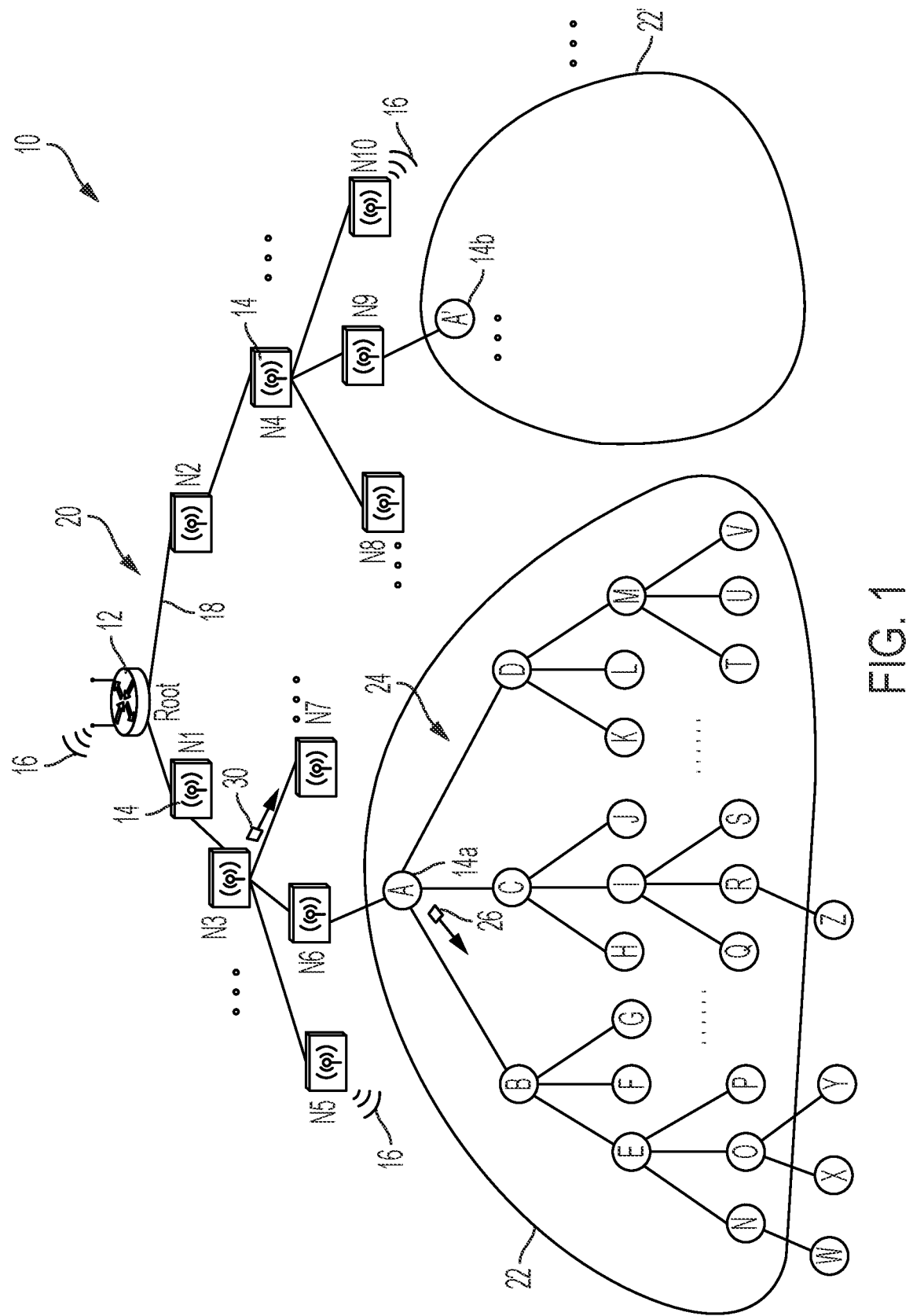
FIG. 1 illustrates an example low power and lossy network (LLN) having a constrained LLN device in a localized subregion of the LLN and configured for establishing a thin destination oriented directed acyclic graph (DODAG) operating in multicast-only transmission mode, according to an example embodiment.

In one embodiment, a method comprises: generating, by a constrained low power and lossy network (LLN) device that is localized within a subregion of an LLN, a thin destination oriented directed acyclic graph (DODAG) having up to a prescribed limit of attached LLN devices at each hop of the thin DODAG based on generating a DODAG information object (DIO) message specifying an instruction for limiting attachment at each hop of the thin DODAG to the prescribed limit; and causing, by the constrained LLN device, multicast-only transmissions via the thin DODAG based on inserting into the DIO message a multicast-only transmission mode via the thin DODAG and outputting the DIO message, the DIO message causing each neighboring LLN device to selectively attach to the constrained LLN device as an attached child LLN device based on the instruction and execute the multicast-only transmissions via the thin DODAG.

In another embodiment, an apparatus is implemented as a physical machine. The apparatus comprises non-transitory machine readable media configured for storing executable machine readable code, wherein the apparatus is implemented as a constrained low power and lossy network (LLN) device, a device interface circuit, and a processor circuit. The processor circuit is configured for executing the machine readable code, and when executing the machine readable code operable for: attaching to a parent LLN device localized within a subregion of an LLN; generating a thin destination oriented directed acyclic graph (DODAG) having up to a prescribed limit of attached LLN devices at each hop of the thin DODAG based on generating a DODAG information object (DIO) message specifying an instruction for limiting attachment at each hop of the thin DODAG to the prescribed limit; and causing multicast-only transmissions via the thin DODAG based on inserting into the DIO message a multicast-only transmission mode via the thin DODAG and causing the device interface circuit to output the DIO message, the DIO message causing each neighboring LLN device to selectively attach to the apparatus as an attached child LLN device based on the instruction and execute the multicast-only transmissions via the thin DODAG.

In another embodiment, one or more non-transitory tangible media encoded with logic for execution by a machine and when executed by the machine operable for: generating, by the machine implemented as a constrained low power and lossy network (LLN) device that is localized within a subregion of an LLN, a thin destination oriented directed acyclic graph (DODAG) having up to a prescribed limit of attached LLN devices at each hop of the thin DODAG based on generating a DODAG information object (DIO) message specifying an instruction for limiting attachment at each hop of the thin DODAG to the prescribed limit; and causing multicast-only transmissions via the thin DODAG based on inserting into the DIO message a multicast-only transmission mode via the thin DODAG and outputting the DIO message, the DIO message causing each neighboring LLN device to selectively attach to the constrained LLN device as an attached child LLN device based on the instruction and execute the multicast-only transmissions via the thin DODAG.

DETAILED DESCRIPTION

Particular embodiments enable a constrained LLN device to generate a "thin" DODAG that is localized within a subregion of a large-scale LLN. The constrained LLN device can operate as the local DODAG root based on requiring the local DODAG to have "thin" topology: the thin DODAG topology is established based on the constrained LLN device, operating as the "local thin DODAG root" (or "thin DODAG root"), specifying in each local DIO message an instruction that limits attachment at each hop of the DODAG to a prescribed limit of attached child network devices (e.g., attached child LLN devices). Hence, the "thin" DODAG has only up to a prescribed number of child LLN devices at each hop. Consequently, any LLN device attempting to attach to the thin DODAG root (or a thin DODAG parent) already having the prescribed number of child LLN devices is forced to join the thin DODAG via a thin DODAG parent at a lower level and that does not yet have the prescribed limit of attached child network devices.

The local DODAG root also specifies in the local "thin" DIO message a multicast-only transmission mode that indicates only multicast messages are transmitted by the thin DODAG root via the thin DODAG identified in the DIO message. Hence the use of a multicast-only transmission mode in the thin DODAG eliminates the need for the local DODAG root (or any thin DODAG parent) to store any table entries other than an identification (e.g., by link layer address) of attached child network devices (up to the prescribed limit of child network devices), and multicast addresses used for subscription of multicast domains used in the thin DODAG. Hence, the local DODAG root and the thin DODAG parents having extremely limited memory resources (e.g., 5 k to 512 k bytes) can implement the thin DODAG for multicast transmissions in a scalable manner.

FIG. 1 is a diagram illustrating an example low power and lossy network (LLN) 10 having a root network device 12 and LLN devices (e.g., "N1" through "N10" and "A" through "Z", "A1'", etc.) 14, also referred to as RPL devices or RPL network devices 14, according to an example embodiment. The LLN 10 can be implemented as an Internet Protocol version 6 (IPv6) wireless radio frequency (RF) mesh network, deployed for example using wireless link layer protocols such as IEEE 802.15.4e and/or IEEE 802.15.4g (referred to herein as "IEEE 802.15.4e/g"). In particular, the LLN 10 can be implemented as a smart grid Advanced Metering Infrastructure (AMI) network that can utilize a connected grid mesh (CG-Mesh) that comprises a field area router (FAR) implemented as a root network device 12 and thousands of LLN devices 14, where each LLN device 14 can possibly reach, within its transmission range of its corresponding wireless data link 16, hundreds of neighboring LLN devices 14. The root network device 12 also can be referred to as an LLN border router (LBR). The root network device 12 can be implemented, for example, based on a commercially-available Cisco® Connected Grid Router (CGR) such as the CGR 1000 Series, commercially available from Cisco Systems, San Jose, California, modified as described herein. The LLN 10 also can include an application server and/or a network manager (e.g., a Field Network Director (FND)) (not shown), via a private and/or public local and/or wide area network (WAN) such as the Internet (not shown).

A Low-Power and Lossy Network (LLN) 10 typically operates with strict resource constraints in communication, computation, memory, and energy. Such resource constraints may preclude the use of existing IPv6 unicast or multicast routing and forwarding mechanisms. Traditional IP multicast delivery typically relies on topology maintenance mechanisms to discover and maintain routes to all subscribers of a multicast group. However, maintaining such topologies in LLNs is costly and may not be feasible given the available resources.

Memory constraints may limit LLN devices 14 to maintaining links and/or routes to one or a few neighbors, hence RPL according to RFC 6550 specifies both storing and non-storing modes: non-storing mode enables a RPL network device 14 to maintain only one or a few default routes towards an LLN Border Router (LBR) (i.e., root network device) 12 and use source routing to forward messages away from the LBR. The memory constraints also prevent an LLN device 14 from maintaining no more than a few multicast routing topologies.

A network topology (e.g., a "RPL instance" according to RFC 6550) 20 can be established based on creating routes toward a single "root" network device (e.g., a backbone router) 12 in the form of a directed acyclic graph (DAG) toward the DAG root 12, where all routes in the LLN 10 terminate at the DAG root 12 (also referred to as a "DAG destination"). Hence, the DAG also is referred to as a Destination Oriented DAG (DODAG) 20. Network traffic can move either "up" towards the DODAG root 12 or "down" away from the DODAG root 12 and towards the DODAG leaf nodes (e.g., leaf nodes "W", "X", "Y", "Z", etc.). The root network device 12 can output RPL-based DODAG Information Object (DIO) messages 30 according to RFC 6550 and specifying an identified objective function (OF) and associated topology network metrics (including a DODAG rank of the advertising root network device 12), for formation of a DODAG-based network topology 20 that supports multicast operations.

A "child" network device detecting the DIO 30 can select the DAG root 12 as a parent in the identified DODAG 20 based on comparing network topology metrics (advertised in the DIO) to an identifiable objective function of the RPL instance (e.g., specified in the DIO). The "child" network device (e.g., "N3"), upon attaching to its parent, can output its own updated DIO 30 with updated network topology metrics (including an updated DODAG rank) that enable other RPL network devices (e.g., "N5", "N6", "N7", etc.) 14 to discover the DODAG 20, learn the updated network topology metrics, and select a DODAG parent.

As described in RFC 6550, each RPL network device 14, in response to receiving a DIO message 30 from the root network device 12 and/or a parent RPL network device 14 in the tree-based DODAG topology 20, can execute an objective function (OF) specified in the DIO message 30 that enables the RPL network device 14 to determine its own "rank" within the DODAG topology 20, where the root network device 12 can be allocated a relatively low-valued rank (e.g., "1"), and a next-hop LLN device (e.g., "N1" or "N2") can calculate a relatively-higher rank (e.g., "20") based on the corresponding rank of the parent root network device 12 (specified in the received DIO Message) and topology-based metrics associated with execution of the OF. Hence, a LLN device 14, in response to attaching to the root network device 12, can output an updated DIO message 30 specifying the corresponding "rank" of the RPL network device 14 relative to the root network device 12, enabling other network devices to join the tree-based DODAG topology 20 resulting in the tree-based DODAG topology. Hence, a child (e.g., "N3") 14 can use the identified objective function and calculate for itself a higher rank (e.g., "50") relative to the corresponding rank (e.g., "20") advertised by its parent (e.g., "N1"), and output an updated DIO 30 specifying the corresponding rank (e.g., "50"), enabling the next child device (e.g., "N5") 14 to calculate its own corresponding rank (e.g., "100"), etc.

Hence, a LLN device 14 can calculate its own rank within the DODAG 20 based on executing the objective function identified in the received DIO message 30, and based on the advertised rank and advertised metrics from the received DIO message 30, detected attributes (e.g., Received Signal Strength Indicator (RSSI)) associated with reception of the DIO message, prescribed constraints or policies set in the LLN device 14 (e.g., minimum/maximum permitted rank values, etc.). Hence the "rank" used by a LLN device 14 can identify a relative positional priority of the LLN device 14 within the LLN device 14, but is distinct from a hop count value: in other words, a "hop count" is not and cannot be used as a "rank" as described herein because a "rank" monotonically increases away from the root network device 12 for formation of the DODAG 20, and the "rank" is determined based on execution of an identified objective function (and therefore can have a nonlinear increase in rank values). Additional details regarding calculating a rank value can be found, for example, in Section 8.2 of RFC 6550.

Downward routes (i.e., away from the DAG root 12) can be created based on Destination Advertisement Object (DAO) messages that are created by a RPL node 14 and propagated toward the DAG root 12. The root network device 12 generating the RPL instance 20 can implement downward routes in the DAG 20 of the LLN 10 in either a storing mode only (fully stateful), or a non-storing mode only (fully source routed by the DAG root). In storing mode, a RPL node 14 unicasts its DAO message to its parent node, such that RPL nodes 14 store downward routing table entries for their "sub-DAG" (the "child" nodes connected to the RPL node). In non-storing mode the RPL nodes 14 do not store downward routing tables, hence a RPL node 14 unicasts its DAO message to the DAG root 12, such that all data packets are sent to the DAG root 12 and routed downward with source routes inserted by the DAG root 12.

Although only the RPL network devices "N1" and "N4" are labeled with the reference numeral "14", and LLN device "A" with "14a" and LLN device "A'" with 14b to avoid cluttering in the Figures, it should be apparent that all the RPL network devices "N1" through "N10", "A" through "Z" and "A'" are allocated the reference numeral "14" for purposes of the description herein. Further, it should be apparent that all the network devices "N1" through "N10", "A" through "Z" and "A'" are configured for establishing wireless data links 16 and DODAG parent-child connections 18 (collectively "wireless DODAG parent-child connections"), even though only the wireless DODAG parent-child connection 18 between the root network device 12 and the RPL network device "N2" is labeled with the reference numeral "18" (and only the wireless data links 16 of the root network device 12 and the RPL network devices "N5" and "N10" are labeled) to avoid cluttering in the Figures.

Conventional deployments of the RPL protocol (e.g., according to RFC 6550) can suffer from many inefficiencies in a DAG network topology 20 in LLNs 10 that contain thousands of network devices 14 that are densely deployed in the data network 10. In particular, LLN devices 14 in localized area or subregion (e.g., an identifiable neighborhood, an underground "vault" of metering devices in a large apartment or office building, etc.) 22 of the LLN 10 may need to be triggered to perform a prescribed operation (e.g., increase a smart light setting in response to detecting a pedestrian, diagnostics for selected CG-mesh devices in the LLN subregion 22, etc.). Use of storing mode as described in RFC 6550 is not feasible due to the storage requirements exceeding the constrained memory capacities of existing LLN devices such as the thin DODAG root "A" 14a positioned as a "gateway" in the LLN subregion 22 to a parent "N6" outside the LLN subregion 22: in this example, the storing mode requirements for the LLN node "A" 14a can exceed the memory capacity of the LLN node "A" 14a, in particular because RPL as described in RFC 6550 (or RFC 7731) places no restrictions on the number of attached child network devices that can attach to a RPL parent; hence, a DODAG 20 can become too "fat" with too many child network devices attached to the same parent network device, resulting in memory congestion in the parent network device.

Nonstoring mode as described in RFC 6550 also is not feasible in constrained LLN devices 14 due to the substantial memory requirements in the root network device 12 storing all route table entries for all the LLN devices 14 in the LLN 10: the root network device 12 typically is required to be implemented as a fully functioning device having substantially large memory capacity for storing the thousands of route table entries for each of the constrained LLN devices 14 in the LLN device 10. In contrast, an LLN device 14 having a memory capacity of only about 512 k bytes is incapable of storing more than about a few dozen route table entries.

Moreover, nonstoring mode as described in RFC 6550 can cause substantial latency in larger LLNs, especially because multicasting in RPL requires a sequence of unicast retransmissions to each of the subscribing LLN devices 14 in a multicast group, which can result in an exponentially-increasing latency based on the number of multicast subscribers and the nature of the DODAG topology providing the sequential unicast transmissions to the multicast subscribers.

In particular, RPL implements multicast by sequential unicast transmissions to attached child network devices: hence, a multicast transmission by the root 12 requires the root 12 to initiate a unicast transmission to the LLN device "N1" 14 at a first transmission instance (e.g., timeslot), followed by a unicast transmission of the multicast packet to the LLN device "N2" at a second different transmission instance (e.g., timeslot). Further multicast transmissions in the DODAG 20 require additional sequential unicast transmissions at different transmission instances, for example "N1 to N3" then "N2 to N4", then "N3 to N5", "N3 to N6", then "N3 to N7", then "N4 to N8", then "N4 to N9", then "N4 to N10", then "N6 to "A", etc. The example transmission sequences are illustrative, and in some examples an LLN device (e.g., "N3") may be required to wait until other network devices elsewhere in the DODAG 20 (e.g., "A'" 14b) has received its multicast packet.

Hence, a 4-hop unicast transmission from the root network device 12 to the LLN device "A" 14a can be accomplished in as few as four (4) transmission instances, whereas a multicast transmission by the root network device 12 may require the LLN device "A" 14a to wait up to twelve (12) transmission instances or longer, depending on transmission sequences in the LLN device 10. Hence, use of multicast transmissions originated by the root network device 12 can result in substantial latency encountered by the leaf network devices "W", "Z", "Y", and "Z".

According to example embodiments, the constrained LLN device "A" 14a can generate a "thin" DODAG 24 that is localized within the LLN subregion 22. The constrained LLN device "A" 14a can operate as a local DODAG root based on suppressing retransmission of a root-originated DIO message (specifying the global instance identifier established by the root network device 12) 30, and generating a local"thin" DIO message 26 that specifies an instruction (28 of FIG. 4) that limits attachment at each hop of the thin DODAG 24 to a prescribed limit (e.g., "MAX=4") of attached child network devices (e.g., attached child LLN devices) 14. Hence, the "thin" DODAG 24 has only up to a prescribed number of child LLN devices 14 at each hop. Consequently, any LLN device (e.g., "R") 14 attempting to attach to the thin DODAG root "A" 14a (or a thin DODAG parent such as "C") already having the prescribed number of child LLN devices is forced to join the thin DODAG 24 via a thin DODAG parent at a lower level (e.g., "I") and that does not yet have the prescribed limit of attached child network devices.

The local DODAG root 14a also specifies in the local "thin" DIO message 26 a multicast-only transmission mode instruction (e.g., "MOP=M-cast only") 32 that indicates only multicast messages are transmitted by the thin DODAG root 14a via the thin DODAG 24 identified in the local "thin" DIO message 26. The thin DODAG root "A" 14a also can specify in the local "thin" DIO message 26 that the "thin" DODAG 24 is a "local" DODAG having a "local instance identifier" 34 (distinct from the global instance identifier used for the large-scale LLN) and a DODAG identifier 36 based on an IPv6 address of the thin DODAG root "A" 14a, for example according to Sections 3.2.5, 3.4, and 5.1 of RFC 6550.

Hence the multicast-only transmission mode in the thin DODAG 24 eliminates the need for the LLN device 14 (or any thin DODAG parent "B" through "V") to store any table entries other than an identification (e.g., by link layer address) of attached child network devices (up to the prescribed limit of child network devices), and multicast addresses used for subscription of multicast domains used in the thin DODAG 24. Hence, the local DODAG root and the thin DODAG parents having extremely limited memory resources (e.g., 5 k to 512 k bytes) can implement the thin DODAG 24 for multicast transmissions in a scalable manner.

Figure 2:
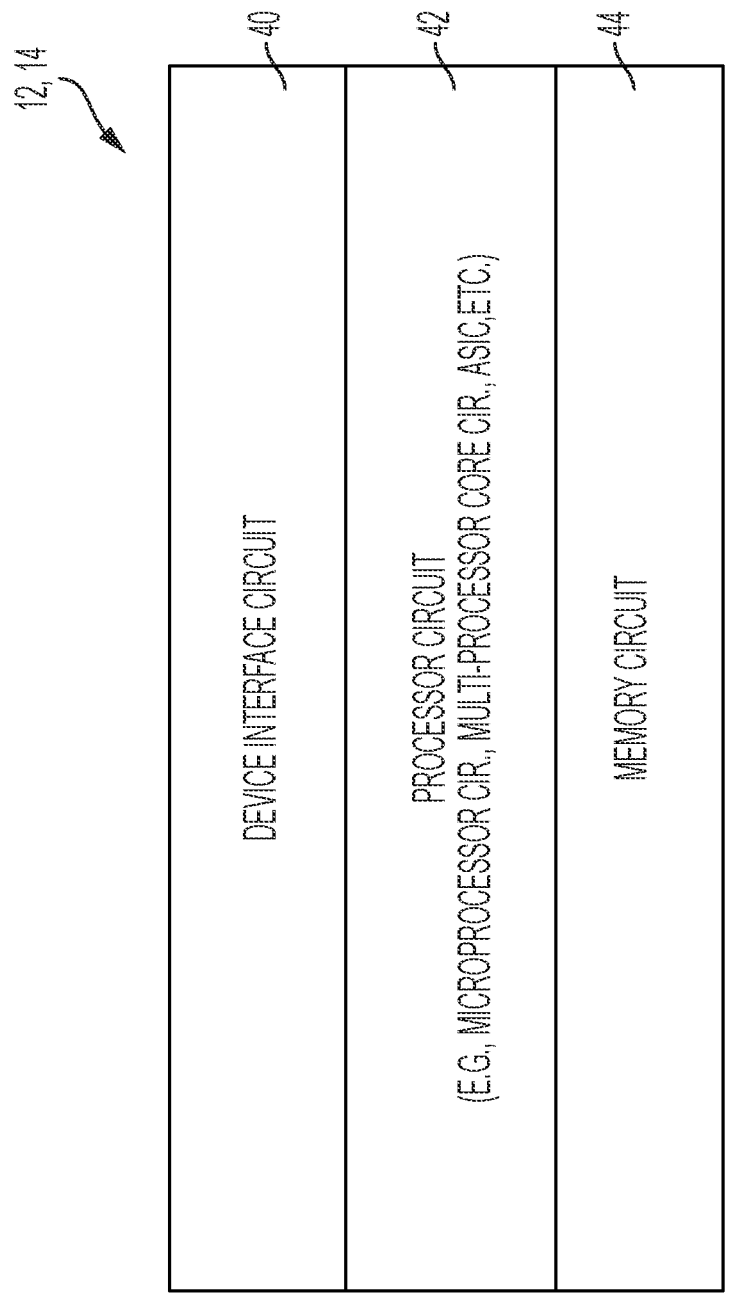
FIG. 2 illustrates an example implementation of any one of the network devices of FIG. 1, according to an example embodiment.

FIG. 2 illustrates an example implementation of any of the network devices 12, 14 of FIG. 1, according to an example embodiment. Each apparatus 12, 14 is a physical machine (i.e., a hardware device) configured for implementing network communications with other physical machines via the LLN 10. The term "configured for" or "configured to" as used herein with respect to a specified operation refers to a device and/or machine that is physically constructed and arranged to perform the specified operation.

Each apparatus 12, 14 can include a device interface circuit 40, a processor circuit 42, and a memory circuit 44. The device interface circuit 40 can include one or more distinct physical layer transceivers for communication with any one of the other devices 12, 14; the device interface circuit 40 also can include an IEEE based Ethernet transceiver for communications with the devices of FIG. 1 via any type of data link (e.g., a wired or wireless link, an optical link, etc.). The processor circuit 42 can be configured for executing any of the operations described herein, and the memory circuit 44 can be configured for storing any data or data packets as described herein.

Any of the disclosed circuits of the devices 12, 14 (including the device interface circuit 40, the processor circuit 42, the memory circuit 44, and their associated components) can be implemented in multiple forms. Example implementations of the disclosed circuits include hardware logic that is implemented in a logic array such as a programmable logic array (PLA), a field programmable gate array (FPGA), or by mask programming of integrated circuits such as an application-specific integrated circuit (ASIC). Any of these circuits also can be implemented using a software-based executable resource that is executed by a corresponding internal processor circuit such as a microprocessor circuit (not shown) and implemented using one or more integrated circuits, where execution of executable code stored in an internal memory circuit (e.g., within the memory circuit 44) causes the integrated circuit(s) implementing the processor circuit to store application state variables in processor memory, creating an executable application resource (e.g., an application instance) that performs the operations of the circuit as described herein. Hence, use of the term "circuit" in this specification refers to both a hardware-based circuit implemented using one or more integrated circuits and that includes logic for performing the described operations, or a software-based circuit that includes a processor circuit (implemented using one or more integrated circuits), the processor circuit including a reserved portion of processor memory for storage of application state data and application variables that are modified by execution of the executable code by a processor circuit. The memory circuit 44 can be implemented, for example, using a non-volatile memory such as a programmable read only memory (PROM) or an EPROM, and/or a volatile memory such as a DRAM, etc.

Further, any reference to "outputting a message" or "outputting a packet" (or the like) can be implemented based on creating the message/packet in the form of a data structure and storing that data structure in a non-transitory tangible memory medium in the disclosed apparatus (e.g., in a transmit buffer). Any reference to "outputting a message" or "outputting a packet" (or the like) also can include electrically transmitting (e.g., via wired electric current or wireless electric field, as appropriate) the message/packet stored in the non-transitory tangible memory medium to another network node via a communications medium (e.g., a wired or wireless link, as appropriate) (optical transmission also can be used, as appropriate). Similarly, any reference to "receiving a message" or "receiving a packet" (or the like) can be implemented based on the disclosed apparatus detecting the electrical (or optical) transmission of the message/packet on the communications medium, and storing the detected transmission as a data structure in a non-transitory tangible memory medium in the disclosed apparatus (e.g., in a receive buffer). Also note that the memory circuit 44 can be implemented dynamically by the processor circuit 42, for example based on memory address assignment and partitioning executed by the processor circuit 42.

FIGS. 3A-3E illustrate an example method of establishing the thin DODAG having up to a prescribed limit of attached LLN devices at each hop and operating in multicast-only transmission mode, according to an example embodiment.

The operations described with respect to any of the Figures can be implemented as executable code stored on a computer or machine readable non-transitory tangible storage medium (i.e., one or more physical storage media such as a floppy disk, hard disk, ROM, EEPROM, nonvolatile RAM, CD-ROM, etc.) that are completed based on execution of the code by a processor circuit implemented using one or more integrated circuits; the operations described herein also can be implemented as executable logic that is encoded in one or more non-transitory tangible media for execution (e.g., programmable logic arrays or devices, field programmable gate arrays, programmable array logic, application specific integrated circuits, etc.). Hence, one or more non-transitory tangible media can be encoded with logic for execution by a machine, and when executed by the machine operable for the operations described herein.

In addition, the operations described with respect to any of the FIGURES can be performed in any suitable order, or at least some of the operations can be performed in parallel. Execution of the operations as described herein is by way of illustration only; as such, the operations do not necessarily need to be executed by the machine-based hardware components as described herein; to the contrary, other machine-based hardware components can be used to execute the disclosed operations in any appropriate order, or execute at least some of the operations in parallel.

Figure 3A:
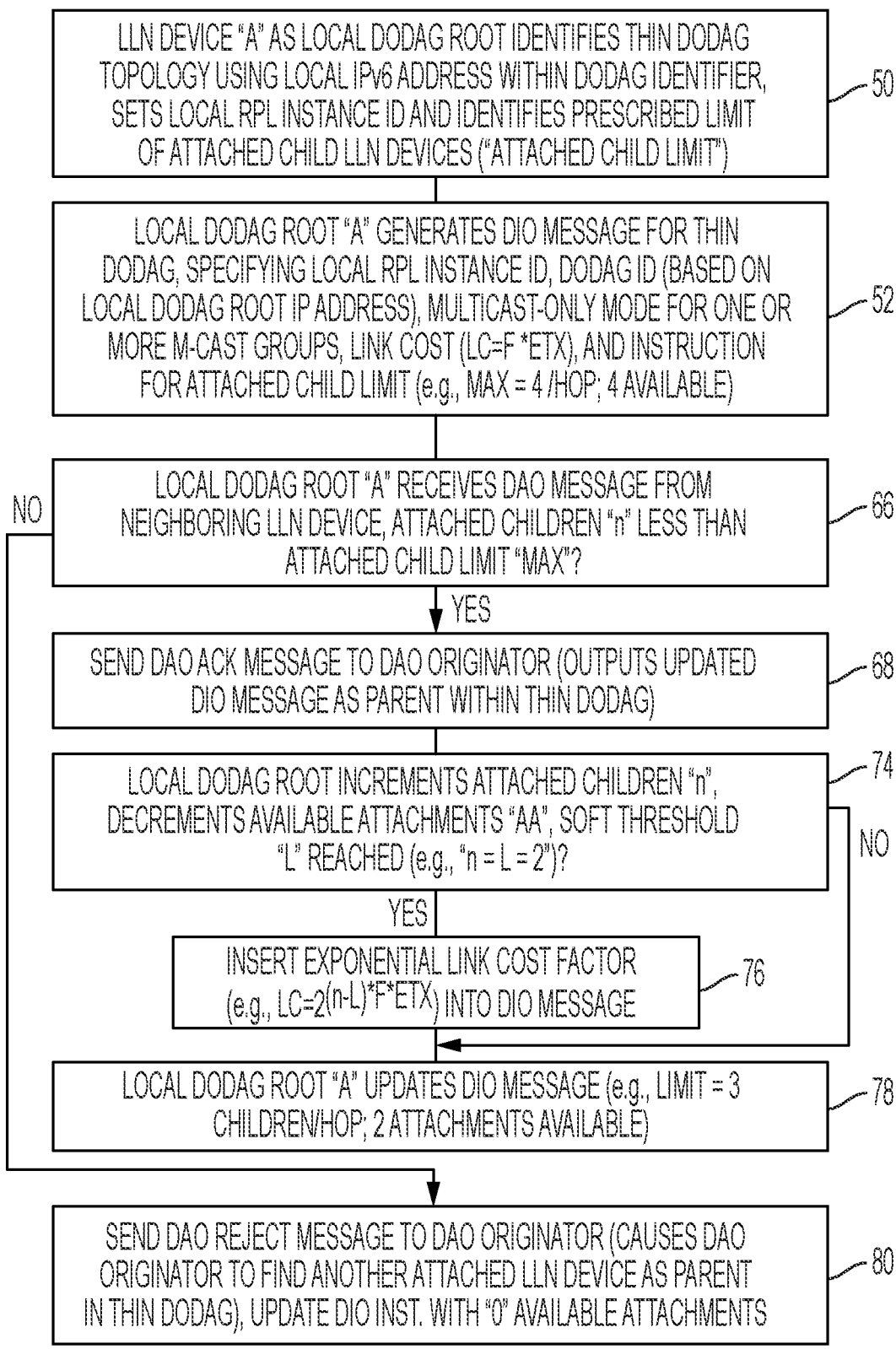
FIGS. 3A-3E illustrate an example method of establishing the thin DODAG having up to a prescribed limit of attached LLN devices at each hop and operating in multicast-only transmission mode, according to an example embodiment.
Figure 4:
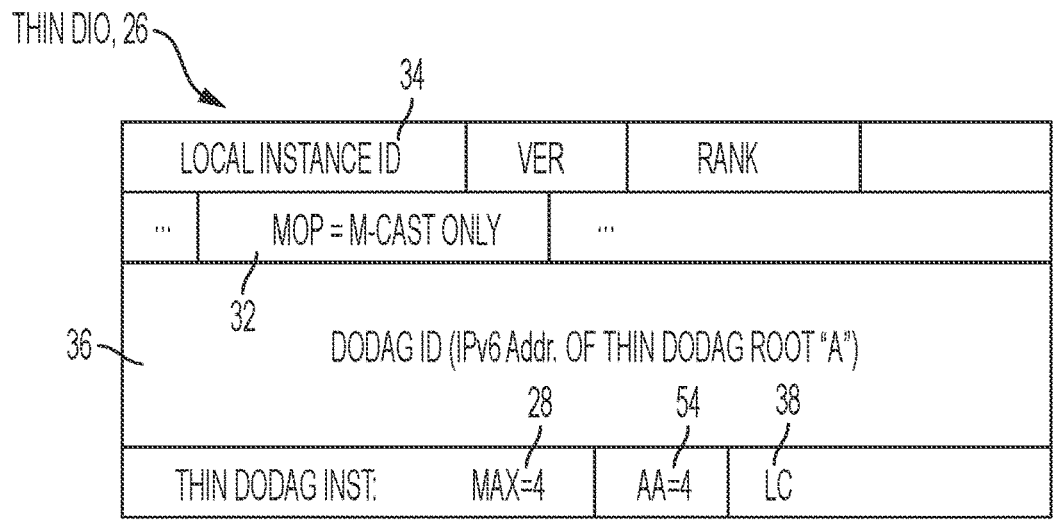
FIG. 4 illustrates an example DODAG Information Object (DIO) message generated and output by the constrained LLN device of FIG. 1, according to an example embodiment.

Referring to FIG. 3A, the processor circuit 42 of the thin DODAG root "A" 14*a* can attach to the DODAG 20 in response to receiving the root-initiated DIO message 30 from the parent LLN device "N6" 14, and in response initiate generation of a thin DODAG 24, for example based on pre-configured instructions stored in the processor circuit 42 and/or the memory circuit 44, and/or based on an instruction sent to the thin DODAG root "A" 14*a* via the root network device 12. The processor circuit 42 of the thin DODAG root "A" 14*a* in operation 50 can suppress retransmission of the root-initiated DIO message 30 and identify itself as the local DODAG root based on generating a DODAG identifier 36 using an allocated IPv6 address, setting the local instance identifier 34 as described in RFC 6550, and generating an instruction specifying a prescribed limit "MAX" of attached children 28 as an "attached child limit", for example "MAX=4". As illustrated in FIG. 4, the processor circuit 42 of the thin DODAG root "A" 14*a* in operation 52 of FIG. 3A can generate the local "thin" DIO message 26 that specifies the local instance identifier 34, the DODAG identifier 36 (based on an allocated IPv6 address of the LLN device "A" 14*a*), the multicast-only transmission mode instruction 32, and the prescribed limit "MAX" of attached children 28. The processor circuit 42 of the thin DODAG root "A" 14*a* also can generate and insert into the local "thin" DIO message 26 a link cost "LC" 38 and an available attachment identifier "AA" 54 that initially is set to equal the prescribed limit "MAX" of attached children 28 because there are not yet any attached child LLN devices. Hence, the processor circuit 42 of the thin DODAG root "A" 14*a* in operation 52 can cause the device interface circuit 40 to output the local "thin" DIO message 26 to initiate generation of the thin DODAG 24.

Figure 3B:
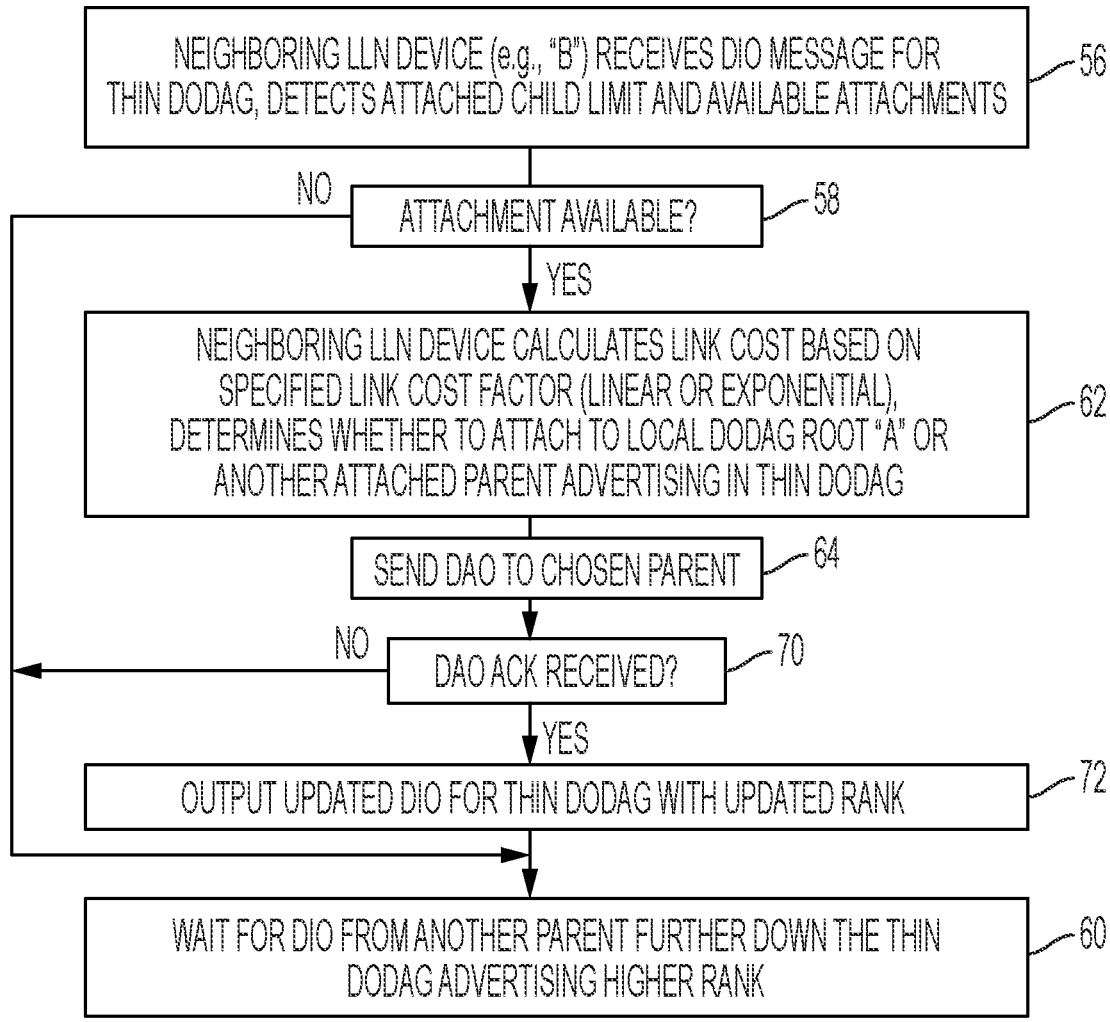

Referring to FIG. 3B, each neighboring LLN device (e.g., "B") in operation 56 can respond to receiving the local "thin" DIO message 26 by selectively attaching to the thin DODAG root "A" 14*a*, for example based on determining in operation 58 a nonzero value for the available attachment identifier "AA" 54. As described below, if in operation 58 the neighboring LLN device 14 detects a zero value for the available attachment identifier "AA" 54, the neighboring LLN device 14 can determine that the current advertising parent network device cannot accept any additional child attachments, causing the neighboring LLN device 14 in operation 60 to wait for another local DIO message from another parent LLN device in the thin DODAG 24.

The neighboring LLN device (e.g., "B") 14 in operation 62 also can determine whether to attach to the thin DODAG root "A" 14*a* based on the relative link cost, for example based on the link cost "LC" 38 specifying a linear link cost such as an expected transmission count (ETX) specified in the local "thin" DIO message 26 multiplied by a prescribed factor "F" (e.g., "LC=ETX*F", where "*" denotes a multiplication operation). In particular, the neighboring LLN device (e.g., "B") 14 in operation 62 can calculate, based on the link cost "LC" 38 whether the link layer cost in attaching to the advertising candidate parent network device (in this case the thin DODAG root "A" 14*a*) is within an acceptable cost, or whether the calculated link cost for the neighboring LLN device 14 is unacceptable. The link cost "LC" 38 can be used as a parameter in the objective function executed by the neighboring network LLN device (e.g., "B") 14 to determine whether to attach to the advertising candidate parent network device as a preferred parent, or whether an alternate candidate parent network device should be chosen as a preferred parent. Once the neighboring LLN device (e.g., "B") 14 has chosen a parent in operation 62, the neighboring LLN device 14 can calculate its rank relative to the preferred parent.

As described below, the link cost "LC" 38 alternately can specify an exponential link cost that can cause the neighboring network device to attempt attachment to another advertising parent network device in the thin DODAG 24 that does not advertise such an "expensive" link cost.

The neighboring LLN device (e.g., "B") 14 in operation 64 can thus selectively attach to the thin DODAG root "A" 14*a* and in response unicast transmit to the thin DODAG root "A" 14*a* a DAO message indicating the neighboring network device (e.g., "B") 14 has attached as an attached child LLN device to the thin DODAG root "A" 14*a*.

Referring to FIG. 3A, the processor circuit 42 of the thin DODAG root "A" 14*a*, in response to receiving the DAO message from the neighboring network device (e.g., "B") 14, can determine in operation 66 from an internal data structure (stored in its memory circuit 44) whether the number of attached children "n" is less than the prescribed limit "MAX" of attached children 28. Since the processor circuit 42 of the thin DODAG root "A" 14*a* in operation 66 can determine that the number of attached children is initially zero ("n=0"), the processor circuit 42 of the thin DODAG root "A" 14*a* in operation 68 can unicast transmit a DAO acknowledgment to its child LLN device "B" 14, causing the attached child LLN device "B" 14 to respond to receiving the DAO acknowledgment in operation 70 of FIG. 3B by outputting in operation 72 an updated local "thin" DIO message 26 having an updated rank as described in RFC 6550.

Referring to FIG. 3A, the processor circuit 42 of the thin DODAG root "A" 14*a* in operation 74 responds to the attached child LLN device "B" 14 by incrementing the number of attached children ("n=n+1"), decrementing the available attachment identifier "AA" 54 ("AA=AA−1"), and determining whether a soft threshold limit "L" has been reached ("n=L") indicating the number "n" of attached children is approaching the prescribed limit "MAX" of attached children 28. For example, the soft threshold "L" can be set to fifty percent to seventy-five percent of the prescribed limit "MAX" of attached children 28, for example fifty percent for a relatively low prescribed limit "MAX" (e.g., L=0.5*MAX if MAX≤8), or seventy-five percent for a higher prescribed limit "MAX" (e.g., L=0.75*MAX if MAX>8).

If in operation 74 the soft threshold has been reached ("n=L"), the processor circuit 42 of the thin DODAG root "A" 14a in operation 76 can insert into the link cost "LC" 38 of the local "thin" DIO message 26 an exponential link cost factor. As illustrated in operation 76, the link cost "LC" can be exponentially increased based on the number of attached network devices "n" beyond the soft threshold limit "L", relative to the prescribed factor "F" and the expected transmission count "ETX" (e.g., $LC=2^{(n-L)*F*ETX}$).

Hence, the processor circuit 42 of the thin DODAG root "A" 14a in operation 78 can update the local "thin" DIO message 26 with the updated available attachment identifier "AA" 54, and the link cost "LC" 38 with the exponentially-increasing link cost if needed, and output the updated local "thin" DIO message 26 for other neighboring network devices attempting to attach to the thin DODAG root "A" 14a.

Hence, any other neighboring network device (e.g., "D") 14 that has not yet attached to the thin DODAG 24 can respond in operation 56 of FIG. 3B to the updated local "thin" DIO message 26 by determining from the available attachment identifier "AA" 54 whether an attachment is still available. If the number attached child network devices has reached the soft threshold "L", the exponential link cost factor specified in the local "thin" DIO message 26 can cause a neighboring network device (e.g., "J") to avoid in operation 62 the thin DODAG root "A" 14a due to the exponentially-high link cost and select an alternate parent LLN device (e.g., "C") that may be lower in the thin DODAG 24 (e.g., advertising a higher rank) but also advertising a lower link cost.

Hence, the exponential link cost factor specified in the link cost "LC" 38 enables the thin DODAG root "A" 14a to "steer" neighboring network devices to other available parent network devices to avoid saturation upon reaching the prescribed limit "MAX" of attached children 28. As illustrated in FIG. 1, the exponential link cost fact can steer the neighboring network devices to a "thinner" tree structure where the thin DODAG root "A" 14a and each parent LLN device 14 in the thin DODAG 24 has up to three attached children despite the prescribed limit "MAX" of attached children 28 equal to "MAX=4", due to the availability of alternate thin DODAG parents further down the thin DODAG root "A" 14a (i.e., more hops away).

If no alternate parent is available and attachment is needed despite the exponential link cost factor, the neighboring network device can send in operation 64 its DAO to the thin DODAG root "A" 14a, causing the processor circuit 42 of the thin DODAG root "A" 14a to decrement the available attachments in operation 74 until the available attachment identifier "AA" 54 specifies zero available attachments. Hence the available attachment identifier "AA" 54 having a value of zero ("AA=0") serves as a notification that the prescribed limit "MAX" of attached children 28 has been reached.

Hence, a neighboring LLN device still attempting attachment to the thin DODAG root "A" 14a detects in operation 58 of FIG. 3B that there are zero available attachments; consequently, the neighboring LLN device is forced in operation 60 to wait for a local "thin" DIO message 26 from an alternate parent in the thin DODAG 24 in order to attempt attachment to an alternate parent.

The processor circuit 42 of the thin DODAG root "A" 14a in operation 66 also can respond to saturation ("n=MAX") by sending in operation 80 a DAO reject message to any network device having sent a DAO message after saturation has been reached, causing a neighboring LLN device 14 in operation 58 to detect that no attachment is available, causing the neighboring LLN device to find another parent network device in operation 60.

Hence, the thin DODAG root "A" 14a can cause the thin DODAG 24 to maintain the prescribed limit of attached child LLN devices at each hop of the thin DODAG 24, limiting the number of DAO state entries that need to be stored by the thin DODAG root "A" 14a or a parent network device 14 in the thin DODAG 24.

As apparent from the foregoing, any existing parent network device (e.g., "B") 14 receiving a DAO message from a newly-attached child (e.g., "E") need not send the associated reachability information for reaching the newly-attached child "E" up to the thin DODAG root "A" 14a; the existing parent network device "B" 14 can merely store its own storing mode DAO entry for reaching the newly-attached child "E", along with one or more multicast addresses for respective multicast domains to which the newly-attached child "E" has subscribed. Hence, the existing parent network device "B" merely needs to send to the thin DODAG root "A" 14a a multicast subscription request for multicast transmission in the thin DODAG 24. Hence, all parent network devices in the thin DODAG 24 merely need to forward toward the thin DODAG root "A" 14a a multicast subscription request for the subscribing child network devices.

Figure 3C:
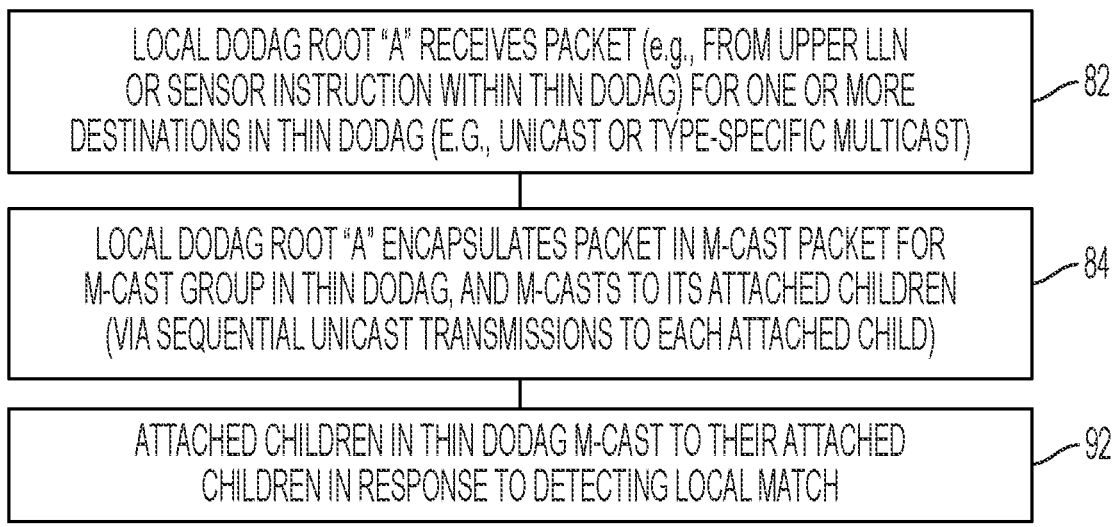

FIG. 3C illustrates multicast transmission of data packets into the thin DODAG 24 by the thin DODAG root "A" 14a, according to an example embodiment. The thin DODAG root "A" 14a can eliminate the necessity of multiple DAO state entries based on implementing the multicast-only transmission mode instruction 32, where the LLN device 14 can store a limited number of multicast addresses that are specified within the DAO messages (or multicast registration requests) received from the attached child network devices.

FIG. 3C illustrates that the multicast-only transmission mode in the thin DODAG 24 enables unicast-in-multicast encapsulation, where the device interface circuit 40 of the thin DODAG root "A" 14a can receive in operation 82 a unicast data packet destined for one of the LLN devices "A" through "V" in the LLN subregion 22 (or leaf devices "W" through "Z" outside the LLN subregion 22, described below). The unicast data packet can be transmitted by an upper LLN parent network device "N6" 14, or from one or more destinations in the thin DODAG 24 that unicast transmits the data packet (containing, for example sensor instruction or notification). The received data packet also can be a multicast-in-multicast encapsulated data packet that specifies type-specific multicast instructions for LLN devices in the LLN subregion 22 (e.g., turn on all smart street lights in grid "XYZ" that are not in the "ON" state). As apparent from RFC 6550, any LLN device 14 in the thin DODAG 24 that does not recognize the destination of a received unicast packet (or multicast address of a received multicast packet from a child network device) can forward the received packet to its default parent, causing the "unrecognized" data packet to eventually reach the LLN device 14 via the thin DODAG 24.

Figure 5:
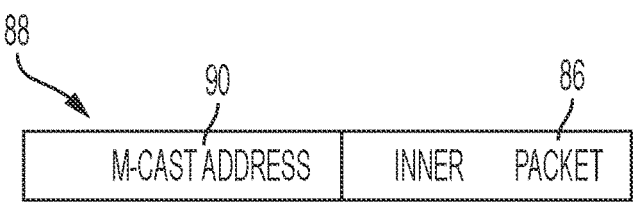
FIG. 5 illustrates an example data packet encapsulated within a multicast packet for multicast transmission in the thin DODAG of FIG. 1, according to an example embodiment.

The processor circuit 42 of the thin DODAG root "A" 14*a* in operation 84 can encapsulate a received packet (unicast or multicast) 86 into a multicast packet (88 of FIG. 5) that specifies a registered multicast address 90 in the outer header for multicast transmission into the thin DODAG 24. The registered multicast address 90 identifies a multicast group having one or more subscribed multicast listeners in the thin DODAG 24 (each multicast listener in the LLN subregion 22 having subscribed, for example, based on sending a corresponding multicast DAO message and/or multicast registration request toward the thin DODAG root "A" 14*a*). As apparent from the foregoing, each LLN device 14 in the thin DODAG 24 can forward a multicast DAO message toward the thin DODAG root "A" 14*a*, causing each parent LLN device in the thin DODAG 24 and the thin DODAG root "A" 14*a* to register the multicast address for the multicast group.

Hence, the attached child network devices 14 in the thin DODAG 24 can multicast the multicast message 88 in operation 92 to their attached children in response to detecting a local match of the multicast address 90 in the local multicast subscriber table. Each child network device 14 also can decapsulate the received multicast packet 88 to determine if there is a match between the child's locally-assigned IPv6 address and the destination address specified in the unicast/multicast packet 86: any child network device that does not detect a match with the destination address in the unicast/multicast packet 86 can drop the packet, and any child network device that identifies a match with the destination address in the encapsulated packet (e.g., where the destination address can be a multicast address based on a device type, device state, etc.) can locally process the encapsulated packet, for example executing an instruction specified in the payload of the encapsulated packet.

Although the use of multicast transmissions in the thin DODAG 24 can create additional dropped data packets throughout the LLN subregion 22, each multicast packet 88 has a substantially smaller size than any unicast source routing header that would be transmitted by the root network device 12 in nonstoring mode, and a substantially smaller latency than would be encountered by the root network device 12 transmitting a unicast data packet in storing mode. Hence, the example embodiments enable scalable deployment of localized distribution of multicast messages in a large scale LLN.

Figure 3D:
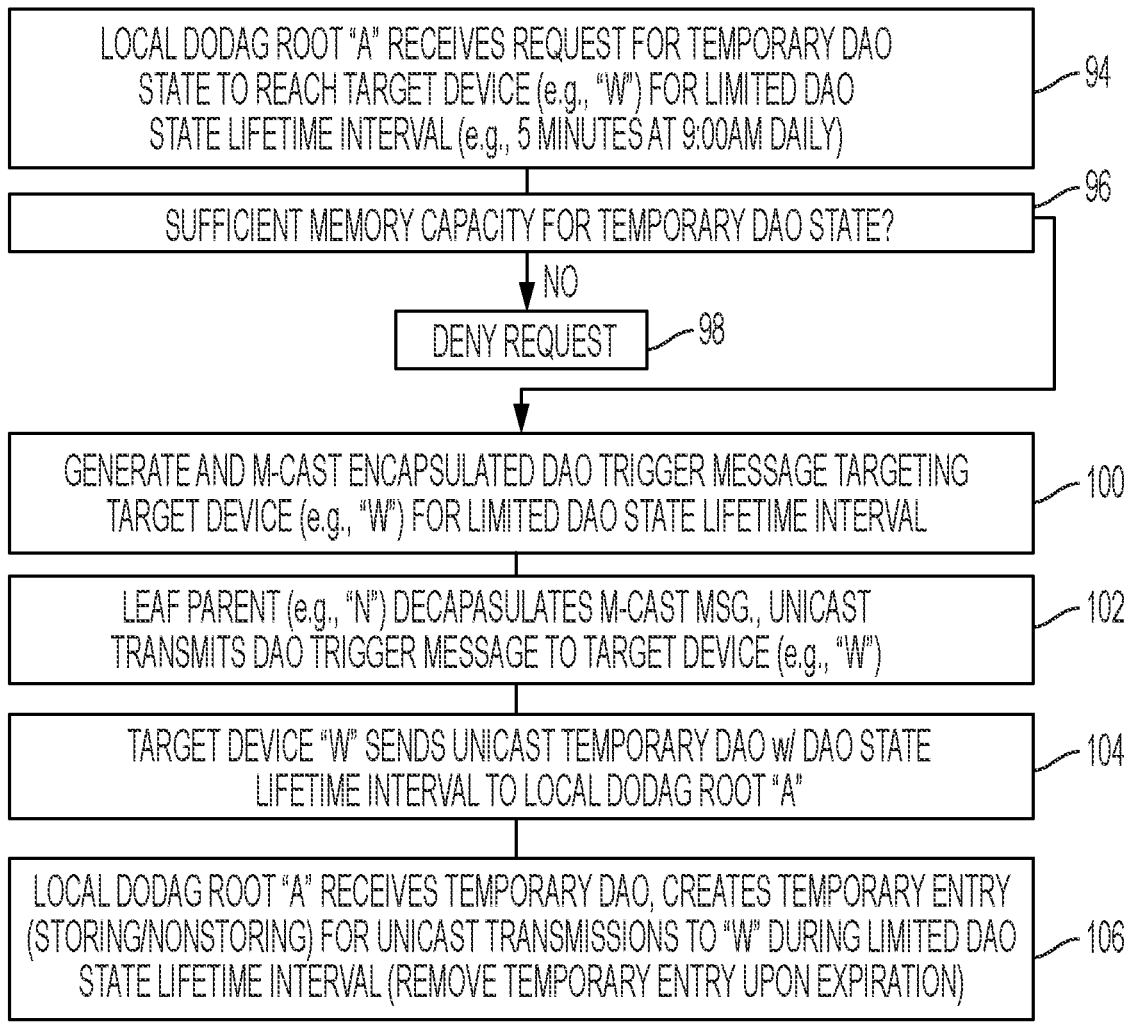
Figure 3E:
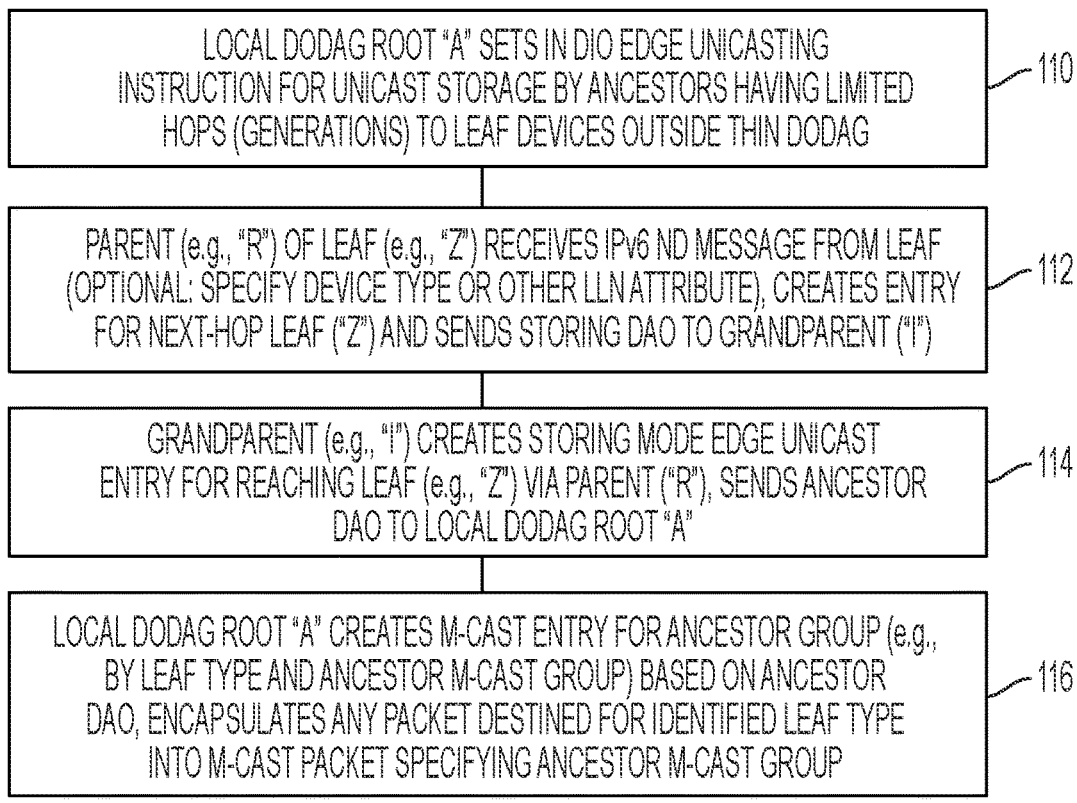

FIGS. 3D and 3E illustrate additional example optimizations that can be implemented by the LLN device 14 in the thin DODAG 24, according to an example embodiment. The example optimizations can provide opportunistic functionality in cases where the memory capacity of the LLN devices 14 in the LLN subregion 22 has not been saturated.

Referring to FIG. 3D, the device interface circuit 40 of the thin DODAG root "A" 14*a* in operation 94 can receive a temporary DAO state request message from one of the attached child LLN devices (e.g., "B") (or from a management device via the root network device 12) requesting generation of a temporary DAO state for an identified LLN device "(e.g., "W") for a limited DAO state lifetime interval (e.g., five (5) minutes). The request can be initiated, for example, based on the LLN device "W" detecting a pattern of relevant sensor activity (or a daily upload of accumulated sensor data) every day in between 9:00 AM and 9:04 AM. The requested temporary DAO state can be for a nonstoring mode state, or a storing mode state that is successively propagated by the parents in between the requesting child LLN device and the thin DODAG root "A" 14*a*. Since the thin DODAG root "A" 14*a* is expected to have the same constraints (e.g., memory capacity) as the other LLN devices 14 in the LLN subregion 22, however, it is expected that all child network devices in the thin DODAG 24 can store the same number of route entries as the thin DODAG root "A"; hence, it is preferable to utilize storing mode to avoid unnecessary load on the thin DODAG root "A" 14*a*.

If in operation 96 the processor circuit 42 of the thin DODAG root "A" 14*a* determines in operation 96 that there is insufficient memory capacity for the temporary DAO state for reaching the identified LLN device (e.g., "W") during the DAO state lifetime interval, the processor circuit 42 of the thin DODAG root "A" 14*a* in operation 98 can multicast an encapsulated DAO reject message that identifies the targeted LLN device (e.g., "W"), and that specifies a multicast address 90 registered in the thin DODAG 24 (e.g., for ad-hoc demand services in the LLN subregion 22).

If in operation 96 the processor circuit 42 of the thin DODAG root "A" 14*a* determines there is sufficient capacity for the requested temporary DAO state, the processor circuit 42 of the thin DODAG root "A" 14*a* in operation 100 can generate and output an encapsulated DAO trigger message that identifies the targeted LLN device (e.g., "W") within an encapsulated packet 88 that specifies a multicast address 90 registered in the thin DODAG 24. Hence, the multicast packet 88 can be multicasted throughout the thin DODAG 24 and received by the leaf parent LLN device "N" 14 in operation 102, causing the leaf parent "N" 14 to decapsulate in operation 102 the multicast packet 88, and unicast transmit the DAO trigger message to its attached child leaf target device "W". In one embodiment, the leaf target device "W" can be inside the thin DODAG 24 as a RPL capable device, and can respond to the DAO trigger message in operation 104 by unicast transmitting to the thin DODAG root "A" 14*a* a temporary DAO message that specifies the DAO state lifetime interval (e.g., five (5) minutes at 9:00 AM daily).

If the targeted LLN device "W" 14 is a non-RPL capable device that is outside the thin DODAG 24, the parent network device "N" can act as a proxy on behalf of the targeted LLN device "W" and send to the thin DODAG root "A" 14*a* the request in operation 94 and the temporary DAO in operation 104.

Hence, the processor circuit 42 of the thin DODAG root "A" 14*a* in operation 106 can respond to the received temporary DAO by creating a temporary route table entry, for unicast transmissions to the targeted device "W" during the limited 5-minute DAO state lifetime interval: in one embodiment, the thin DODAG root "A" 14*a* can be configured for scheduling the DAO state lifetime interval (e.g., five (5) minutes at 9:00 AM daily) if the thin DODAG root "A" 14*a* has sufficient memory capacity; alternately, to conserve memory resources for other LLN devices 14 the thin DODAG root "A" 14*a* can require each LLN device 14 to request a temporary DAO state on a per-session basis. The processor circuit 42 of the thin DODAG root "A" 14*a* can delete the temporary DAO state entry upon expiration of the lifetime interval in operation 106, releasing the memory resources for another temporary DAO state by another LLN device in the LLN subregion 22. Hence, the thin DODAG root "A" 14*a* can control memory utilization in its memory circuit 44 within its memory constraints by maintaining a multicast-only thin DODAG 24, and selectively permitting a temporary DAO state based on the availability of storage capacity; in contrast, RFC 6550 permits a storing-mode operation with multicast support (MOP=3) throughout the an entire DODAG, such that the memory requirements for the DODAG root would quickly overwhelm the limited memory constraints of an LLN device 14.

Hence, the use of temporary DAO state as described above enables the thin DODAG root "A" 14a to provide a temporary unicast DAO state for each LLN device 14 in the LLN subregion 22 based on spreading the unicast transmission allocations over time; hence, an even distribution of five-minute unicast transmission sessions among the LLN devices 14 in the LLN subregion 22 enables the thin DODAG root "A" 14a to use a single DAO entry location in its memory circuit 44 to establish two-hundred eighty eight (288) 5-minute sessions for the LLN devices over a twenty-four hour period.

FIG. 3E illustrates another example optimization that can avoid unicast at the core of the thin DODAG 24 rooted by the thin DODAG root "A" 14a, but that can enable limited unicast storing mode at the edge of the thin DODAG 24 that typically comprises limited routes but a majority of the multicast destinations. The processor circuit 42 of the thin DODAG root "A" 14a in operation 110 can cause edge unicasting in the thin DODAG 24 based on setting in the local "thin" DIO message 26 an edge unicasting instruction (not shown in FIG. 4) for unicast storage by ancestor devices having a limited number of hops (or "generations") from leaf network devices at the end of the thin DODAG 24 or outside the thin DODAG 24. For example, given the prescribed limit "MAX" of attached children 28 was set to "MAX=4", then each parent has a maximum number of four (4) child entries: if a two-hop/two-generation ancestor (grandparent) was permitted to operate in storing mode, then the maximum number of storing mode entries would be sixteen for sixteen grandchildren. Hence, if each LLN device 14 has sufficient storage for sixteen (16) storing mode entries, the processor circuit 42 of the thin DODAG root "A" 14a can set a two-hop/two-generation limit for limited storing mode unicast routes.

Hence, the processor circuit 42 of the thin DODAG root "A" 14a in operation 110 can cause the device interface circuit 40 to output the local "thin" DIO message 26 that specifies the edge unicasting instruction for limited storing mode unicast routes in the ancestors (e.g., grandparents) of leaf devices in the LLN subregion 22.

Each parent LLN device (e.g., "R") of a leaf LLN device (e.g., "Z") in operation 112 having joined the thin DODAG 24 based on receiving a local "thin" DIO message 26 specifying the edge unicasting instruction can respond to receiving either a DAO message as described above, or an IPv6 Neighbor Discovery (IPv6ND), for example as described in RFC 4861, by creating an entry for the next-hop leaf (e.g., "Z") 14 and sending a storing DAO message to the grandparent network device (e.g., "I") 14.

Each grandparent network device (e.g., "I") can create in operation 114 a storing mode edge unicast entry, based on the local "thin" DIO message 26 specifying the edge unicasting instruction and the storing DAO message, for reaching the leaf network device "Z" via the parent "R". The grandparent network device "I" in operation 114 can send an Ancestor DAO message to the thin DODAG root "A" 14a requesting subscription to an "ancestor" multicast group (e.g., "GRANDPA GROUP"). The grandparent network device "I" suppresses further retransmission of the storing mode DAO message forwarded by the parent network device "R".

Hence, the processor circuit 42 of the thin DODAG root "A" 14a in operation 116 can store in its memory circuit 44 a multicast group entry that identifies the multicast group "GRANDPA GROUP" for the ancestor LLN devices that are up to two hops away from the leaf network devices, based on receiving the DAO message originated by the grandparent network device "I" 14. The multicast group entry identifying the ancestor LLN devices enables the processor circuit 42 of the thin DODAG root "A" 14a in operation 116 to send a unicast/multicast packet 86 to any one or more of the leaf network devices based on encapsulating the packet 86 in a multicast packet 88 comprising the multicast header comprising the multicast address 90 for the multicast group "GRANDPA GROUP". The transmitted multicast packet 88 for the multicast group "GRANDPA GROUP" can cause the subscribing grandparent LLN device "I" to decapsulate the multicast packet 88 and unicast transmit the unicast/multicast packet 86 to one or more of the LLN devices, as appropriate, based on a unicast route to the one or more LLN devices, or a multicast group address for a particular type of LLN device. As described previously, the encapsulated packet 86 can be a multicast-type packet that identifies within its destination address a device topology type (e.g., "ALL LEAF DEVICES"), operation (e.g., SMART STREETLAMPS NOT IN THE ON STATE", "ALL TRAFFIC LIGHTS NOT IN THE RED STATE"), etc. If the destination in the decapsulated unicast/multicast packet 86 is not known, the grandparent network device (or parent network device) can forward the decapsulated unicast/multicast packet 86 to all children.

In another variation, if in operation 114 the grandparent (e.g., "I") is saturated and cannot accept any more storing mode DAO entries, the grandparent can return the DAO message to the parent "R" with an overflow notification, causing the parent "R" to create its own storing mode DAO entry and send to the thin DODAG root "A" 14a the ancestor DAO to the thin DODAG root "A" 14a that subscribes the parent "R" 14 to the "GRANDPA GROUP". Hence, the grandparent "I" can create a multicast entry noting the child network device "R" is a member of the "GRANDPA GROUP", enabling the grandparent "I" to multicast forward any such multicast messages 88 to the child network device "R".

Hence, example embodiments enable scalable transmission of a directed set of data packets to specific destinations within a subregion of the LLN.

According to example embodiments, "lightweight" communications can be deployed in a localized subregion of a large-scale LLN based on generation of thin DODAGs and broadcast-only transmissions that limits the memory requirements for storage of topology parameters in an LLN device operating as a root network device.

While the example embodiments in the present disclosure have been described in connection with what is presently considered to be the best mode for carrying out the subject matter specified in the appended claims, it is to be understood that the example embodiments are only illustrative, and are not to restrict the subject matter specified in the appended claims.

What is claimed is:

1. A method comprising:
    generating, by a network device, a destination oriented directed acyclic graph (DODAG) that is rooted by the network device, the generating of the DODAG based on outputting an instruction implementing multicast communication in the DODAG; and
    multicasting, by the network device, a targeted packet that is destined for at least one targeted member device of the DODAG, the targeted packet causing sequential unicast communications in the DODAG, wherein the targeted packet causes a router device in the DODAG to establish a unicast route for reaching the destination device within a prescribed limited number of hops, and wherein the targeted packet is a unicast packet specifying a destination address encapsulated within a multicast packet specifying a multicast address, the at least one targeted member device operating as a destination device and processing the unicast packet in response to detecting the destination address associated with the destination device.

2. The method of claim 1, further comprising:

receiving from the targeted member device an advertisement message that enables the network device to reach the destination device via a next-hop network device; and causing unicast transmission to the destination device for up to a limited state lifetime interval, based on receiving the advertisement message.

3. The method of claim 2, wherein the limited state lifetime interval is based on a prescribed schedule specified by the network device.

4. An apparatus implemented as a physical machine, the apparatus comprising:

non-transitory machine readable media configured for storing executable machine readable code, wherein the apparatus is implemented as network device;

a device interface circuit; and a processor circuit configured for executing the machine readable code, and when executing the machine readable code operable for:

generating a destination oriented directed acyclic graph (DODAG) that is rooted by the network device, the generating of the DODAG based on outputting an instruction implementing multicast communication in the DODAG, and multicasting a targeted packet that is destined for at least one targeted member device of the DODAG, the targeted packet causing sequential unicast communications in the DODAG, wherein the targeted packet causes a router device in the DODAG to establish a unicast route for reaching the destination device within a prescribed limited number of hops, and wherein the targeted packet is a unicast packet specifying a destination address encapsulated within a multicast packet specifying a multicast address, the at least one targeted member device operating as a destination device and processing the unicast packet in response to detecting the destination address associated with the destination device.

5. The apparatus of claim 4, wherein the processor circuit is configured for:

receiving from the targeted member device an advertisement message that enables the network device to reach the destination device via a next-hop network device; and causing unicast transmission to the destination device for up to a limited state lifetime interval, based on receiving the advertisement message.

6. The apparatus of claim 5, wherein the limited state lifetime interval is based on a prescribed schedule specified by the network device.

7. One or more non-transitory tangible media encoded with logic for execution by a machine and when executed by the machine operable for:

generating, by the machine implemented as a network device, a destination oriented directed acyclic graph (DODAG) that is rooted by the network device, the generating of the DODAG based on outputting an instruction implementing multicast communication in the DODAG; and multicasting a targeted packet that is destined for at least one targeted member device of the DODAG, the targeted packet causing sequential unicast communications in the DODAG, wherein the targeted packet causes a router device in the DODAG to establish a unicast route for reaching the destination device within a prescribed limited number of hops, and wherein the targeted packet is a unicast packet specifying a destination address encapsulated within a multicast packet specifying a multicast address, the at least one targeted member device operating as a destination device and processing the unicast packet in response to detecting the destination address associated with the destination device.

8. The or more non-transitory tangible media of claim 7, further operable for:

receiving from the targeted member device an advertisement message that enables the network device to reach the destination device via a next-hop network device; and causing unicast transmission to the destination device for up to a limited state lifetime interval, based on receiving the advertisement message.

* * * * *